(12) United States Patent
Hildebrand (10) Patent No.: US 6,366,789 B1
(45) Date of Patent: Apr. 2, 2002

(54) EXPLORING RADIO BASE STATION CONFIGURATIONS

(75) Inventor: Uwe Hildebrand, Erlangen (DE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 09/280,273

(22) Filed: Mar. 29, 1999

(51) Int. Cl.[7] .................................................. H04B 1/38
(52) U.S. Cl. ...................... 455/561; 455/67.4; 455/424; 455/67.1; 455/562
(58) Field of Search ................................. 455/67.1, 561, 455/562, 432, 426, 454, 84, 423, 273, 272, 13.3, 424, 115, 67.4; 343/876

(56) References Cited

U.S. PATENT DOCUMENTS

| | | | | |
|---|---|---|---|---|
| 5,574,981 A | * | 11/1996 | Ahonen ...................... 455/67.4 |
| 5,754,560 A | * | 5/1998 | Nousiainen et al. ....... 371/70.5 |
| 5,890,056 A | * | 3/1999 | Garner et al. .............. 455/67.1 |
| 5,974,322 A | * | 10/1999 | Carlsson et al. ........... 455/446 |
| 6,041,228 A | * | 3/2000 | Niska et al. ................ 455/419 |
| 6,138,034 A | * | 10/2000 | Willey ........................ 455/522 |
| 6,141,566 A | * | 10/2000 | Gerdisch et al. ........... 455/562 |

FOREIGN PATENT DOCUMENTS

| | | |
|---|---|---|
| EP | 0 439 926 A | 8/1991 |
| WO | WO 95/08875 | 3/1995 |

OTHER PUBLICATIONS

Standard European Search Report mailed Nov. 11, 1999.
General Specification for RBS 2000 Macro Configurations; EN/LZT 123 2720 RSA Ericsson Radio Systems AB Mar. 9, 1998 pp. 32–93.

* cited by examiner

Primary Examiner—Daniel Hunter
Assistant Examiner—Lana Le
(74) Attorney, Agent, or Firm—Jenkens & Gilchrist, P.C.

(57) ABSTRACT

A method and system for autonomously exploring and identifying an implemented configuration of a radio base station in a mobile telecommunications system. A radio configuration information signal identifying an inbound port and an outbound port of a first combining/distribution unit is generated at the first combining/distribution unit, wherein the inbound port and the outbound port are located along a particular RF signal path between an antenna and a transceiver in the base station. The radio configuration information signal is transmitted from the inbound port of the first combining/distribution unit, along a cable comprising a portion of the RF signal path, and to an outbound port of a second (or of the same) combining/distribution unit of the base station. The radio configuration information signal is received at an outbound port of the second (or of the same) combining/distribution unit and is routed to a corresponding inbound port of the receiving combining distribution unit. The radio configuration information signal is thereafter forwarded to the transceiver along an additional portion of the RF signal path. Using the radio configuration information received at the transceiver, along with information about the internal structure of the combining/distribution units that is stored within the combining/distribution units themselves, the base station is able to determine the particular implemented radio configuration at any given time.

19 Claims, 9 Drawing Sheets

EXPLORING RADIO BASE STATION CONFIGURATIONS

BACKGROUND OF THE INVENTION

1. Technical Field of the Invention

The present invention relates in general to the configuration of radio base stations and, in particular, to a method and system for autonomously determining the configuration of a radio base station in a cellular telecommunications system.

2. Description of Related Art

A base transceiver station in a cellular telecommunications system comprises the necessary hardware for supporting communications in one cell of a cellular system. Generally, a base transceiver station includes one or more antennas, one or more transceivers, and a number of combining/distribution units that contain various signal processing and/or routing devices for interconnecting the antennas and the transceivers. These signal processing and routing devices in the combining/distribution units can include, for example, filters, duplexers, amplifiers, signal combiners, and signal splitters. A combining/distribution unit can also be integrated in an antenna (e.g., a "tower mounted amplifier"). Radio signals received by a single antenna are often split by the combining/distribution units and routed to several different transceivers. In the transmission direction, on the other hand, radio telecommunications signals from multiple transceivers are often combined and routed to a single antenna. The routing and processing operations of the base transceiver station can widely vary, however, and are typically dependent on the desired characteristics for the particular cell.

One or more such base transceiver stations can be incorporated into a single radio base station of the cellular telecommunications system. The number of base transceiver stations is normally dictated by the number of cells served by the base station. An "omni" radio base station site, for instance, provides 360 degree radio coverage in a single cell. Thus, only one base transceiver station is needed. A two sector site, on the other hand, provides radio coverage for two different areas (i.e. two cells) and two base transceiver stations are needed. Similarly, a three sector site supports radio communications in three cells and uses three base transceiver stations.

A radio base station can be configured into hundreds, or even thousands, of distinct configurations. A particular configuration depends on and is defined by the number of base transceiver stations in the radio base station and on the number, arrangement, and interconnection of combining/distribution units in each base transceiver station. Some typical measures for classifying different radio base station configurations and for differentiating between various configurations are:

(1) the number of antenna systems used by the base station (an antenna system is a set of antennas that is used for receiving and transmitting signals in a specific cell);

(2) the number of transceivers per cell;

(3) the number of implemented receive branches (e.g., a base transceiver station of the base station can be configured so that signals of a particular frequency are received by an antenna and transmitted over a single signal path to a single transceiver, or so that signals of that frequency are routed over multiple signal paths to more than one transceiver); and (4) the amount of signal combining (i.e., the combining of signals from multiple transceivers for transmission from a single antenna or antenna system) that is performed by each combining/distribution unit for the transmission of radio signals from the base station.

The selection of a configuration for use in a particular radio base station typically depends upon the desired operational characteristics of the base station. This is because the different measures listed above directly correspond to certain functional attributes of the base station. For example, the number of antenna systems used depends on how many cells are served by the radio base station. Each cell to be served requires its own antenna system. In addition, the number of transceivers in a given cell affects the offered traffic capacity for that cell. The offered traffic capacity is essentially the maximum traffic flow in a cellular system or part of a cellular system. The number of transceivers used in a base station, therefore, is typically determined according to a desired amount of offered traffic capacity and a tolerable probability of call failures (i.e., due to the cell reaching its call capacity). The desired reception diversity is a third factor that affects the number of receive branches in the configuration. To improve reception at the base station, especially in cases where the signals from a mobile station are somewhat impeded, the number of implemented receive branches should be increased. Finally, combining of signals in the combining/distribution unit causes losses in radio frequency signals to be transmitted. Accordingly, to obtain maximum transmission output power, and thus to obtain the maximum achievable geographic coverage, any combining of signals to be transmitted should be minimized. Thus, the selection of a configuration in a base station is typically influenced by factors such as the number of cells to be served, the expected amount of cellular traffic, the amount of interference in the cell, the size of the cell, and the desired output power and receiver sensitivity for the base station.

A radio base station is capable of implementing any one of a large number of distinct radio configurations. To do so, however, an operator of the radio base station must install a specific radio configuration file. Each radio configuration file comprises a set of data specifying how the transceivers are connected to the antenna systems in both the transmit and receive directions, and what hardware components (i.e., what devices within the combining/distribution units) are used to provide the RF signal paths. Each radio configuration file thereby defines a particular radio transmission and reception functionality. Installation of a radio configuration file is necessary because knowledge about the currently implemented radio configuration, as provided by the installed file, can be required to support several routine functions of the base station, such as calibration or supervision of the various devices in the base station. Typically, a vendor of a base station system develops radio configuration files for a significant number of distinct configurations. Certain ones of these files, selected according to a customer's particular needs, are then provided to the customer for installation into a radio base station.

The use of base station systems that require these individual, fixed radio configuration files has several major disadvantages. First, if the radio configuration of a base station is significantly changed, a new radio configuration file must be loaded into the base station. Such an upgrade requires the selection of an appropriate configuration file. In addition, the installation of the new configuration file requires a certain degree of technical knowledge by the person performing the installation. Moreover, if a different radio configuration file has to be loaded, the complete base station usually has to be taken out of operation, interrupting cellular traffic in that cell.

Changes in the configuration are common and often occur when the desired functional characteristics of the base station change. Such a change can occur, for instance, in the case of a cell split, wherein an omni-directional cell (i.e., an "omni" site) is split into two or more sectorized cells (e.g., a two sector site, as described above), which would necessitate, at a minimum, a change in the number of antenna systems that are used.

A configuration change can also occur when a base station is upgraded to have a higher offered traffic capacity. When a base station system is initially installed, the base station often has a limited cellular traffic capacity because, for instance, initial use in the cells served by the base station is relatively low. Over time, however, a higher traffic capacity might be required as use of the system increases. To increase capacity, the base station must be upgraded to include more hardware equipment. Typically, several configuration options exist for such an upgrade, and when the system is initially installed, it is difficult to predict which configuration will be implemented in the future. Thus, when the system is upgraded, a new configuration file must be installed.

In addition to the disadvantages that result from changes in the configuration, other problems with the current base station set-up exist as well. To support the many different possible configurations, a huge number of radio configuration files need to be developed, implemented, maintained, and handled. Furthermore, in some cases, configuration files may not be available for a particular desired configuration.

There is a need, therefore, for a system and method for permitting a radio base station to autonomously determine and adapt to new configurations. This type of system and method would make a base station system more flexible and easier to handle. The configuration of the base station could be changed, if necessary, on a more frequent basis, and such changes would not require that new configuration files be loaded into the base station. Furthermore, a system and method is needed that would eliminate the need to develop, implement, and maintain large numbers of configuration files and that would significantly reduce the amount of time that base stations are removed from operation, or operate under reduced capacity, for the installation of new configuration files.

SUMMARY OF THE INVENTION

The present invention comprises an autonomous exploration and recognition method and system for identifying an implemented radio configuration for a radio base station in a telecommunications system. According to the invention, radio configuration information signals, comprising a controlled DC voltage variation or digital signal, are transmitted from the antenna interfaces of the base station to the transceivers in the base station along each different RF signal path. Generally, the radio configuration information signals are transmitted from an inbound port (i.e., a combining/distribution unit port on the transceiver side of the combining/distribution unit) to an outbound port (i.e., a combining/distribution unit port on the antenna side of the combining/distribution unit) of interconnected combining/distribution units or, for the last segment of the signal path, from an inbound port of a combining/distribution unit to a port of a transceiver.

Once the radio configuration information signals have propagated through the base station along each of the various signal paths, the transceiver is able to identify the various interconnections between antennas, combining/distribution units, and transceivers along the particular signal path. Using a digital interface between the transceiver and the combining/distribution unit, the transceiver is also able to access information about the internal structure of the combining/distribution units. Thus, the transceivers can collectively determine the radio configuration for the entire base station, and supervision and control functions can be performed accordingly.

The invention can be implemented using a radio configuration information data transfer circuit (for transmitting radio configuration information signals between interconnected combining/distribution units or between a combining/distribution unit and an interconnected transceiver). The data transfer circuit includes a signal generator for encoding the outgoing radio configuration information data (e.g., using digital signals or controlled variations in a DC voltage level). The signal generator is contained in a first combining/distribution unit (or, in general, in the first unit which is located at an end of the signal path to be explored) and is coupled to one end of a cable or a pair of track conductors (or some other type of interconnection) that carries RF signals along a particular signal path and that interconnects the first combining/distribution unit with a second combining/distribution unit or, alternatively, with a different port of the first combining/distribution unit. The second combining/distribution unit includes a signal detector that is coupled to the other end of the cable or other interface and that detects signals from the signal generator. In the same way, the second combining/distribution unit could be connected to a third one and so on. In general, an arbitrary number of combining/distribution units and ports can be handled. Generally, each unit contains signal detectors at outbound ports and signal generators at inbound ports.

Each combining/distribution unit also includes a radio configuration information control circuit for controlling the generation and routing of radio configuration information signals. The control circuit receives radio configuration information signals from the signal detectors and routes the radio configuration information signals to the signal generators of the combining/distribution unit. Preferably, the radio configuration information control circuit is implemented using an application specific integrated circuit and contains circuitry necessary for decoding, storing, routing, and re-coding of radio configuration information signals received from one of the combining/distribution unit's outbound ports. The radio configuration information control circuit transmits the radio configuration information signals to corresponding inbound ports according to the internal RF connections for the combining/distribution unit. In addition, upon initiation of the radio configuration information message generation sequence, the radio configuration information control circuit also generates radio configuration information data for the specific combining/distribution unit itself and transmits the data to the appropriate inbound ports. Thus, each inbound port receives the radio configuration information data for the combining/distribution unit with which it is associated.

BRIEF DESCRIPTION OF THE DRAWINGS

For a more complete understanding of the present invention, reference is made to the following detailed description taken in conjunction with the accompanying drawings wherein.

DETAILED DESCRIPTION OF THE INVENTION

Figure 1:
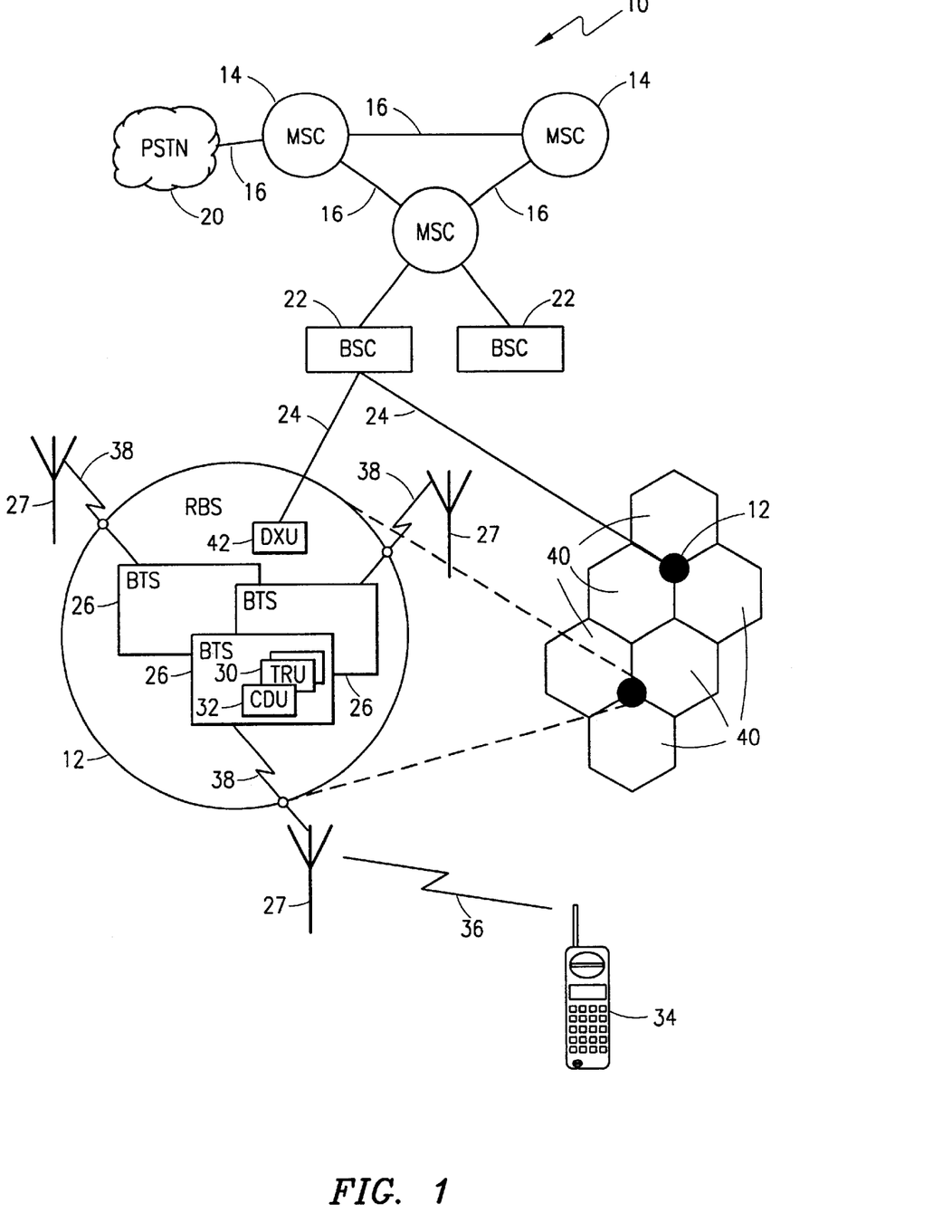
FIG. 1 is a block diagram of a mobile telecommunications network having a magnified inset of a three-sector radio base station (RBS)

Referring now to FIG. 1, there is illustrated a block diagram of a mobile telecommunications network 10 having a magnified inset of a three-sector radio base station (RBS) 12. The mobile telecommunications network 10 includes a plurality of interconnected mobile services switching centers (MSCs) 14 for routing calls through the network via communication and signaling trunks 16. At least one MSC 14 is also connected to a public switched telephone network (PSTN) 20 for transmitting calls to and receiving calls from outside the mobile telecommunications network 10 via a communication and signaling trunk 16. Each MSC 14 is connected to at least one base station controller (BSC) 22, which controls the operation of a plurality of RBSs 12. Each radio base station 12 is connected to the base station controller 22 via an interface 24.

The base station 12 depicted in the inset of FIG. 1 serves cellular radio communications in three cells 40. For each cell 40, the base station 12 includes separate base transceiver stations (BTSs) 26, each coupled to its own antenna system 27. The base transceiver stations 26 include at least one transceiver unit (TRU) 30 and at least one combining/distribution unit (CDU) 32. Calls originating from a mobile station 34 in a cell 40 served by one of the base transceiver stations 26 are transported over an air interface 36 to an antenna unit 28 in the antenna system 27. The call signals received by the antenna system 27 are transmitted over a cable 38 to the corresponding base transceiver station 26. As will be appreciated by those skilled in the art, a waveguide or other interconnection can be used instead of a cable 38. The call signals are routed and processed by the combining/distribution units 32 and delivered to one or more of the transceivers 30, which are responsible for receiving signals from and transmitting signals to mobile stations 34. The call signals are then sent by the base station 12, using a distribution switch unit (DXU) 42, to the MSC 14 (via the BSC 22). The MSC 14 routes the call to another MSC 14 associated with the called party (i.e., if the called party is a mobile station in the same mobile telecommunications network) or to the PSTN 20 if the called party is located outside the network 10. Calls terminating at the mobile station 34 are routed in a similar manner in the opposite direction.

Figure 2:
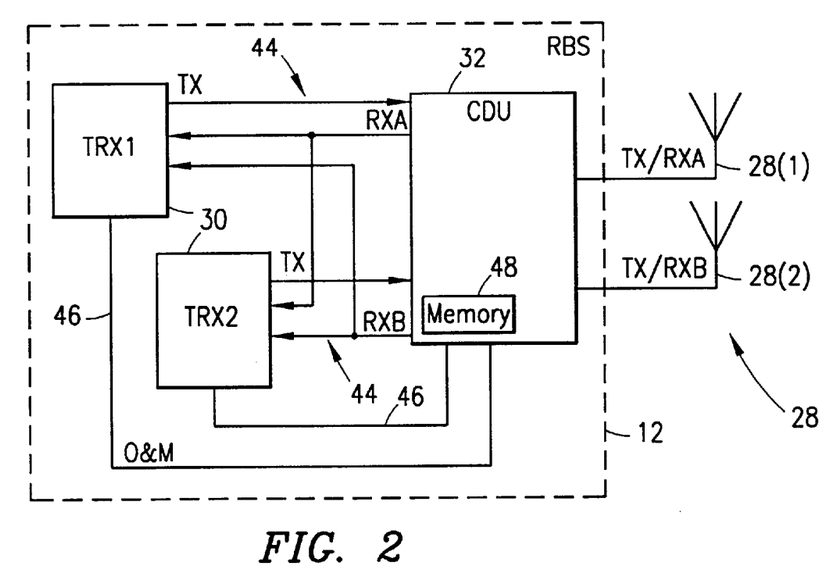
FIG. 2 is a block diagram of a first exemplary radio base station.

Referring now to FIG. 2, there is illustrated a block diagram of a first exemplary RBS 12 comprising an omni site and, thus, having only a single base transceiver station 26. The RBS 12 is coupled to an antenna system 27 comprising at least a first antenna 28(1) and optionally a second antenna 28(2) for exchanging telecommunications signals with a mobile station 34 (FIG. 1). Signals RXA that are received on the first antenna 28(1) are duplexed (i.e., to separate the received signals RXA from transmitted signals TX), amplified, and distributed to each of the transceivers (TRX1 & TRX2) 30 by the combining/distribution unit (CDU) 32. Similarly, signals RXB that are received on the second antenna 28(2) are also duplexed, amplified, and distributed to each of the transceivers (TRX1 & TRX2) 30 by the combining/distribution unit (CDU) 32. Generally, the various signals RXA, RXB, and TX are transported within the base station 12 by radio frequency (RF) connections 44. The two signals RXA and RXB can represent, for instance, signals having different frequencies, signals received in different areas, signals received from two different mobile stations 34, or diversity reception of signals on the same channel. In the transmission direction, signals TX are transmitted from each of the transceivers 30 and are routed by the combining/distribution unit 32 to each of the antennas 28(1) and 28(2). Preferably, the signals TX from a first one of the transceivers (TRX1) 30 are routed by the combining/distribution unit 32 to the first antenna 28(1), while the signals TX from a second one of the transceivers (TRX2) 30 are routed by the combining/distribution unit 32 to the second antenna 28(2). In yet another embodiment, signals TX from different transceivers are combined and routed to a common (or shared) antenna. It may also occur that radio frequency paths within a combining/distribution unit are not permanently fixed, but are instead switched via radio frequency interconnections implemented in a combining/distribution unit over time.

In addition to the RF connections 44, the base station 12 also includes digital interfaces 46 between the transceivers 30 and the combining/distribution unit 32. Operation and maintenance functions are performed within the base station 12 using a digital data transfer of operation and maintenance (O&M) information via the digital interfaces 46. The combining/distribution unit 32 contains a nonvolatile memory 48 that stores data about the individual combining/distribution unit 32. This data includes a unique identification information for the unit 32 (i.e., a serial number) , individual calibration data for the unit 32, and information about the internal structure of the unit 32 for configuration and supervision purposes.

The internal structure information describes, for instance, which ports on an antenna side of the combining/distribution unit 32 are internally connected to each of the ports on a transceiver side of the combining/distribution unit 32. To this end, predefined port codes are assigned to all of the RF ports or connectors for the combining/distribution unit 32. Thus, the internal RF signal sub-paths for the combining/distribution unit 32 can be identified by the input and output port codes for each particular sub-path. It will be appreciated that, if duplexing is performed within the combining/distribution unit 32, the internal sub-paths for incoming (i.e., received) signals differ from the internal sub-paths for outgoing (i.e., to be transmitted) signals. In another embodiment of the p resent invention, the internal structure includes switched radio frequency sub-paths. Therefore, not every possible internal radio frequency connection has to exist at every time.

Using the digital interfaces 46, the transceivers 30 can access the memory 48 to obtain information for supervision of the combining/distribution unit 32. In addition, the transceivers 30 can access the combining/distribution unit memory 48 via the digital interfaces 46 to retrieve the internal structure information. The retrieved information can then be used, in conjunction with data from the radio configuration file stored elsewhere in the base station 12, to essentially build a signaling model for the base station 12. In other words, the base station 12 is aware of each reception signal path and each transmission signal path between the antennas 28(1) and 28(2) and transceivers 30. This knowledge permits the base station 12 to handle cellular traffic in an effective and efficient manner. Furthermore, using this knowledge, the signal paths can be calibrated individually to balance out losses and specific monitoring or supervision mechanisms can be used. Moreover, because switched radio frequency paths inside the radio base station can be handled, even an adaptive system, which allows for switchable RF paths, can be implemented in the radio base station.

Figure 3:
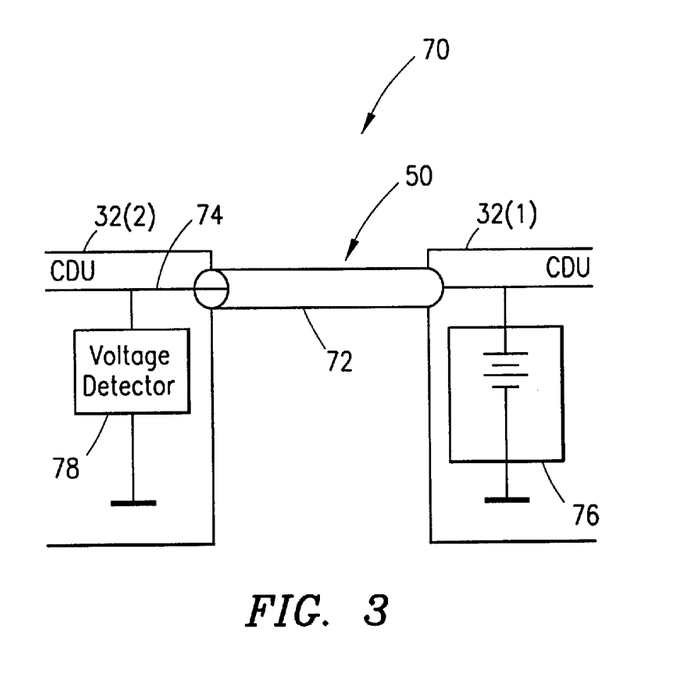
FIG. 3 is a DC-loop mechanism that is used in existing systems for RF cable supervision purposes.

Referring now to FIG. 3, there is illustrated a DC-loop mechanism 70 that is used for RF link or cable supervision purposes in existing systems. In accordance with the DC-loop mechanism 70, a low DC voltage is provided between a shield 72 and an inner conductor 74 of an RF cable 50, which is used for carrying signals to be transmitted, or RF cable 52 (see FIG. 4), which is used for carrying received signals, at one end of the cable 50 or 52 by a DC voltage generator 76 of a first combining/distribution unit 32(1) that the RF cable 50 or 52 is connected to. As will be appreciated by those skilled in the art, other types of signaling links other than an RF cable 50 or 52 can also be used. At the other end of the RF cable 50 or 52, a voltage detector 78 of a second combining/distribution unit 32(2) monitors the DC voltage level between the shield 72 and the inner conductor 74 of the RF cable 50 or 52. If a low DC voltage level is detected by the second combining/distribution unit 32(2), it is known that the RF cable 50 or 52 is connected between two ports. Thus, the RBS 12 is able to monitor the connections between the various combining/distribution units 32 to detect missing or broken connections. However, the RBS 12 in such existing systems is not capable of determining whether the RF cable 50 or 52 is properly connected in accordance with a desired radio configuration.

Figure 4:
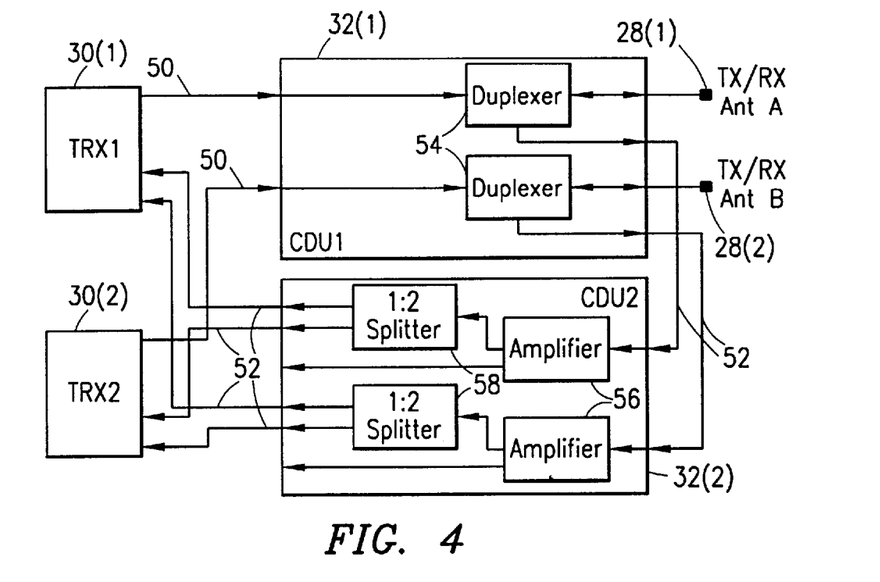
FIG. 4 is a block diagram of a second exemplary base station illustrating the internal sub-paths of the combining/distribution units.

Referring now to FIG. 4, there is depicted a block diagram of a second exemplary base station 12 illustrating the internal sub-paths of the combining/distribution units 32. In the illustrated example, the base station 12 again comprises an omni site for serving a single cell 40. Currently, only two transceivers 30 are installed in the base station 12. It is assumed, however, that the base station can handle up to six transceivers 30. Furthermore, the base station 12 is currently configured to have high output power for the transmission of radio signals and to maximize reception diversity. High output power is achieved in this case by not using hybrid combiners 60 (see FIG. 6), which cause significant RF losses, to combine RF signals to be transmitted. Thus, instead of combining outgoing RF signals from the two transceivers 30 for transmission from only one antenna, RF signals are transmitted by the first transceiver 30(1) over a transmission cable 50, through the duplexer 54 of the first combining/distribution unit 32(1) and to only the first antenna 28(1) for transmission over the air interface 36 (FIG. 1). Similarly, RF signals originating at a second transceiver 30(2) are transmitted only from the second antenna 28(2). To maximize reception diversity, on the other hand, received RF signals are distributed to both of the transceivers 30 through a 1:2 splitter 58 and a corresponding pair of reception cables 52 after first being duplexed by one of the duplexers 54 and amplified by an amplifier 56.

At some later time, additional capacity is needed in the base station 12 due to, for example, increasing amounts of cellular traffic. As a result, additional hardware must be added and a different configuration implemented. Typically, this type of upgrade is performed by installing the additional hardware at the base station site, rearranging and adding cables 50 and 52 to interconnect the various transceivers 30, combining/distribution units 32, and antennas 28, and installing a new configuration file in the base station 12 corresponding to the new interconnections.

Figure 5:
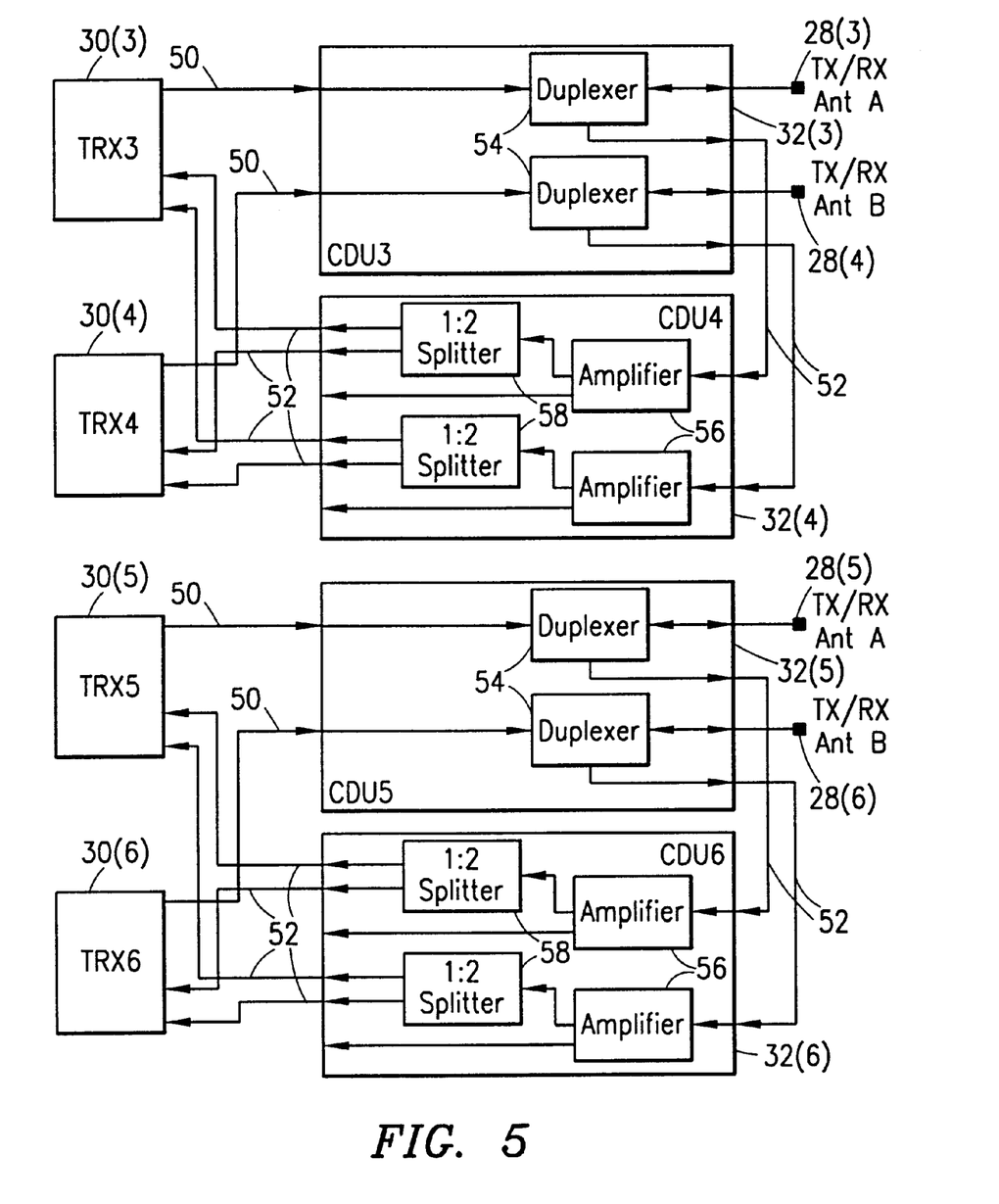
FIG. 5 is a block diagram of additional hardware embodying an exemplary configuration for upgrading the base station of FIG. 4.

Referring now to FIG. 5, there is illustrated a block diagram of additional hardware embodying an exemplary configuration for upgrading the base station 12 of FIG. 4. In this case, the base station 12 is upgraded to support a total of three sector cells 40, each having the same radio configuration as the original cell 40.

Thus, radio communications in one cell 40 are supported by the original hardware. A second cell 40 is served by new third and fourth transceivers 30(3) and 30(4), new third and fourth combining/distribution units 32(3) and 32(4), new third and fourth antennas 28(3) and 28(4), and the necessary interconnecting RF cables 50 and 52. Similarly, a third cell 40 is served by new fifth and sixth transceivers 30(5) and 30(6), new fifth and sixth combining/distribution units 32(5) and 32(6), new fifth and sixth antennas 28(5) and 28(6), and additional interconnecting RF cables 50 and 52. This type of upgrade might be used, for instance, to divide the original cell 40 into three smaller cells 40 covering the same geographical area (i.e., to split an omni-cell into a sectorized cell) or to expand the coverage of the existing network 10 into two new cells 40 covering additional geographic areas. In order to implement such an upgrade, the upgrade of the base station must be supported by the configuration file.

Figure 6:
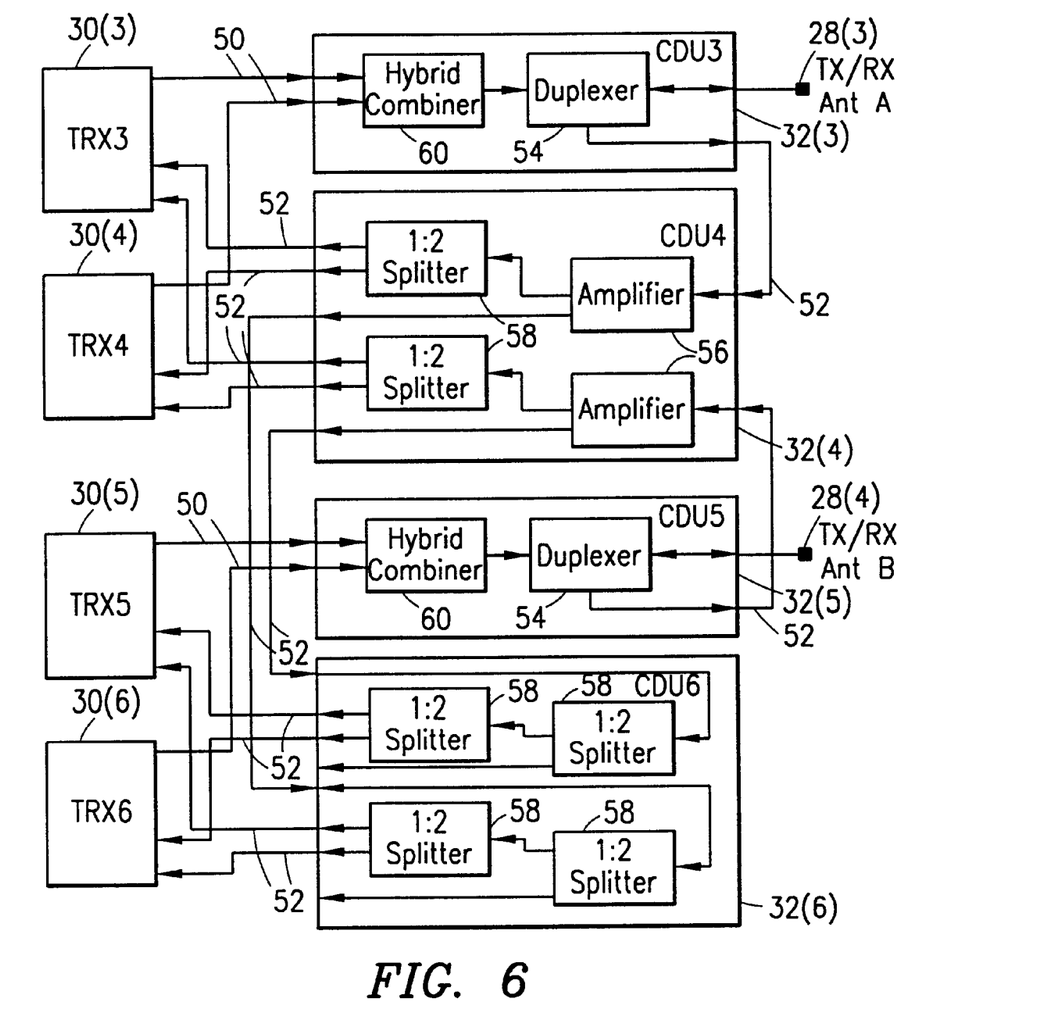
FIG. 6 is a block diagram of additional hardware embodying an alternative exemplary configuration for upgrading the base station of FIG. 4.

Referring now to FIG. 6, there is depicted a block diagram of additional hardware embodying an alternative exemplary configuration for upgrading the base station 12 of FIG. 4. In this case, the base station 12 is upgraded to support a hierarchical cell structure, wherein the original hardware serves an underlaid cell 40 (i.e., identical to the original cell 40) and the additional hardware serves an overlaid cell 40. The overlaid cell 40 might be necessary, for example, for handling increased cellular traffic in a densely populated portion of the original cell 40. The overlaid cell 40 is served by four new transceivers 30(3), 30(4), 30(5), and 30(6), four new combining/distribution units 32(3), 32(4), 32(5), and 32(6), two new antennas 28(3) and 28(4), and the necessary interconnecting RF cables 50 and 52.

Because the overlaid cell 40 preferably covers a smaller geographical area, less output power is required. Therefore, only two new antennas 28(3) and 28(4) are provided and hybrid combining is used to combine outgoing RF signals. RF signals from the third and fourth transceivers 30(3) and 30(4) are combined by a hybrid combiner 60 in the third combining/distribution unit 32(3) for transmission over the air interface 36 by the third antenna 28(3), and RF signals transmitted by the fifth and sixth transceivers 30(5) and 30(6) are combined by a hybrid combiner 60 of the fifth combining/distribution unit 32(5) for transmission by the fourth antenna 28(4). Maximum reception diversity is still desired, so received RF signals from each of the antennas 28(3) and 28(4) are distributed to each of the relevant transceivers 30(3), 30(4), 30(5) and 30(6). As in the preceding configuration shown in FIG. 5, installation of the upgrade of FIG. 6 usually requires that the base station 12 be taken out of operation, again interrupting service in the original cell 40, and that a new configuration file be loaded into the base station 12.

As generally illustrated and discussed in connection with FIGS. 4, 5, and 6, numerous different configurations of RF connections can be implemented in the RBS 12, even when the same combining/distribution units 32 are used. In addition, the RF connections can be intentionally changed when the RBS 12 is reconfigured, or specific RF connections can fail. In accordance with the invention, instead of having to develop, manage, and install a unique radio configuration file that corresponds to the specific configuration that has been implemented, the RBS 12 autonomously explores and recognizes the actual implemented radio configuration (i.e., the used combining/distribution units 32 and the RF connections between these units 32) without the need for operator input.

In other words, information about the RF connections is dynamically generated within the RBS 12 itself. This can be achieved by transmitting radio configuration information (RCI) via the RF signal paths between and among the combining/distribution units 32 and the transceivers 30. In contrast to the RF signals that are used for communications between the transceivers 30 and mobile stations 34 (via the RF links 50 and 52), RCI data is transmitted at a significantly different (preferably lower) frequency using serial data signals over the RF links 50 and 52. The RCI data signals are transmitted starting from the end of the radio paths to be explored, such as from the interfaces to the antenna systems 18 toward the transceivers 30. Along each signal path between the antennas 18 and the transceiver units 30, information about the chain of RF connections is collected, added to the existing RCI data signal, and forwarded toward the transceiver units 30. By the time the RCI data signal is received at a port of a transceiver 30, information about the entire signal path is available.

By performing the generation and collection of RCI data for every possible signal path, the RBS 12 is able to discover the implemented radio configuration. Each transceiver receives RCI data messages for all of the RF paths that the transceiver is using or may use in the currently implemented radio configuration. An RCI data message unambiguously describes a complete RF path by listing all combining/distribution units and the ports of these units that are used on the considered RF path. The RCI data message can also be used to derive a description or summary of the way the combining/distribution units are interconnected. If desired, an overall picture of the implemented radio configuration in the entire base station can be assembled based on the information available in each individual transceiver.

In addition, as discussed above, information about the internal structure (i.e., sub-paths) of combining/distribution units 32 is stored locally within the units 32 themselves and can be accessed, as necessary, by the transceivers 30 via dedicated digital interfaces 46. Thus, the base station 12 is able to independently identify the various individual signal paths between the antennas 18 and the active ports of the transceivers 30 in both the transmission and reception directions using the stored internal sub-path information in conjunction with the generated RCI data. The knowledge about the present RF paths in the implemented radio configuration can, for example, be used for individual calibration and supervision purposes inside the base station.

The autonomous recognition of the currently implemented radio configuration, as can be achieved by the present invention, serves to increase the flexibility of an RBS 12 system by making it possible for the base station 12 to adapt itself to a new or changed configuration. Because radio configurations no longer have to be described in configuration files, there is a greatly reduced lead time for the development and implementation of new radio configurations. In addition, because configuration files no longer have to be reloaded when the configuration is upgraded or changed, there is a reduced amount of out-of-service time for the RBS 12. The invention also simplifies the user interface of the RBS's operation and maintenance terminal because no radio configuration files need to be manually selected. Thus, the base station system permits a "plug and play" type of installation process, making the system substantially easier to handle. Finally, based on a list of allowed port-to-port connections, it is possible to perform consistency checks on the actual implemented radio configurations. Accordingly, the base station 12 can detect wrongly connected RF cables 50 and 52 in addition to missing or broken RF cables 50 and 52. It will be further appreciated by those skilled in the art that the invention is also applicable in special RBS configurations, such as dual-band RBSs and RBSs with adaptive antenna systems, assuming that appropriate control by the transceiver units 30 is provided.

Figure 7:
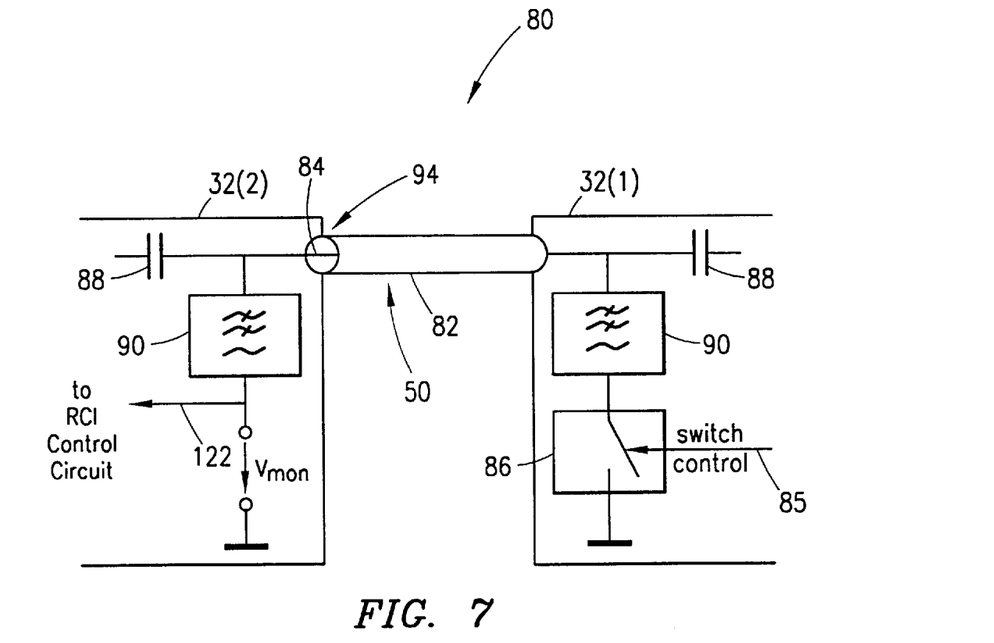
FIG. 7 is an radio configuration information (RCI) data transfer circuit in accordance with the present invention.

Referring now to FIG. 7, there is illustrated an RCI data transfer circuit 80 for use in connection with the invention. The RCI data transfer circuit 80 comprises a modification of the DC-loop mechanism 70 of existing systems (see FIG. 3) to provide for controlled variations in a DC voltage level of RF signals transmitted over the RF cable 50 or 52 (or other type of signaling link). In an additional alternative embodiment, different constant DC voltages can be used to indicate different configurations. Although only an RF transmission cable 50 is depicted in FIG. 7, it will be appreciated that the same RCI data transfer circuit 80 can be used for an RF reception cable 52.

Using the RCI data transfer circuit 80, a unidirectional transfer of serial data via the RF cables 50 and 52 is possible. Binary information is sent out in a serial digital data format by dynamically changing the DC resistance between a shield 82 and an inner conductor 84 of the RF cable 50 or 52. The coded binary data signal is produced by a switch 86 in a first combining/distribution unit 32(1) (or more generally, in any unit at the "exploration end point" of the radio path to be explored) in accordance with signals received over a switch control line 85. At the other end of the RF cable 50 or 52, the coded binary data is received at a second combining/distribution unit 32(2) (or at a different port of the first combining/distribution unit 32(1)) by monitoring the DC voltage level ($V_{mon}$) of the RF signal. The monitored voltage level is transmitted via a connection 122 to an RCI control circuit 120 (see FIG. 11) for processing. Capacitors 88 in the circuit 80 prevent the DC voltage components from being propagated along the RF signal path to other parts of the base station 12. In addition, low pass filters 90 in the RCI data transfer circuit 80 remove the high frequency RF signal components that are transmitted on the same physical connection (i.e., the cable 50 or 52).

On the serial data link, which is provided by the radio frequency cable together with the described modified DC-loop mechanism, timing information can implicitly be transferred with the serial data stream by using a self-clocking code.

Figure 8:
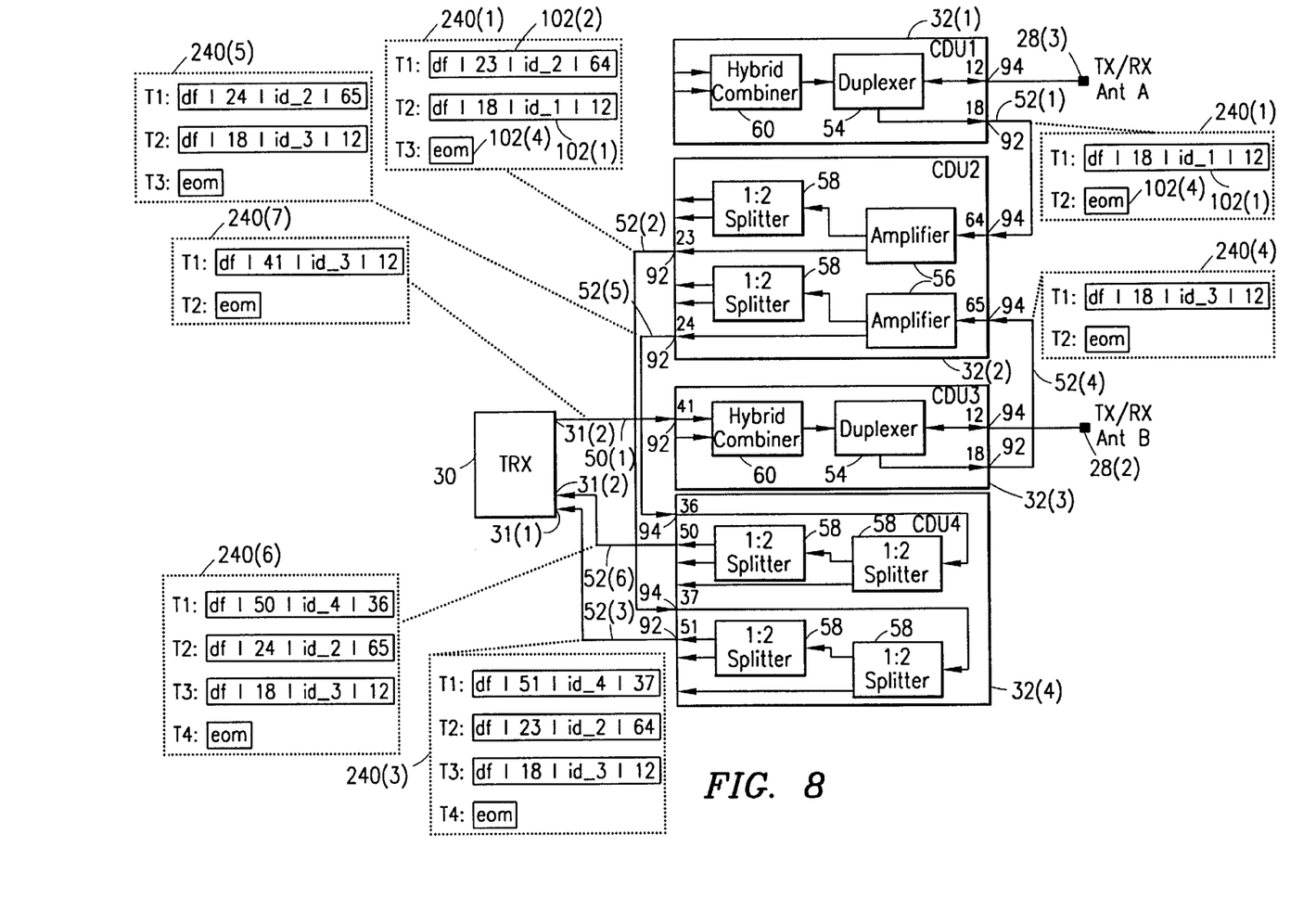
FIG. 8 is a block diagram of a portion of an exemplary radio base station for illustrating the operation of the present invention.

Referring now to FIG. 8, there is depicted a portion of an exemplary RBS 12 for illustrating the operation of the present invention. As mentioned above, the RCI data is transferred from an antenna interface towards the transceiver units 30. Thus, RCI data signals are transmitted toward the transceivers 30 regardless of whether the particular connection comprises a transmission cable 50, a reception cable 52, or a bi-directional RF connection, and therefore, RCI data signals can be transmitted in an opposite direction from the RF signals that use the same signal path. Each combining/distribution unit 32 includes at least one port from each of two different types of RF ports—inbound ports 92 and outbound ports 94. Inbound ports 92 are those ports at which RF signals are received from transceiver units 30 or sent towards transceiver units 30. Outbound ports 94 are those ports at which RF signals are received from antennas 18 or sent towards antennas 18. In accordance with the transfer of RCI data signals toward the transceivers 30, the combining/distribution units 32 send out RCI data signals from inbound ports 92 and receive RCI data signals at outbound ports 94. Thus, each inbound port 92 is coupled to an RCI data transfer circuit switch 86, as shown in FIG. 7, while each outbound port 94 is coupled via a connection 122 to an RCI control circuit 120 (see FIG. 11).

The outbound ports 94 can be further divided into three sub-groups. First, for an antenna port, the outbound port 94 can only be connected to an antenna 18. Second, in a chain-end port, the outbound port 94 can either be connected to an antenna 18 or to an inbound port 92. Finally, for an in-chain port, the outbound port 94 can never be connected to an antenna 18. In-chain ports can only be connected to inbound ports 92. When a combining/distribution unit 32 is designed, each RF port is statically and permanently assigned to one of the above-mentioned groups (i.e., an inbound port 92 or an outbound port 94) and/or sub-groups (i.e., an antenna port, a chain-end port, or an in-chain port). Accordingly, pre-defined port codes are used to identify the particular group or sub-group for the port.

Figure 9:
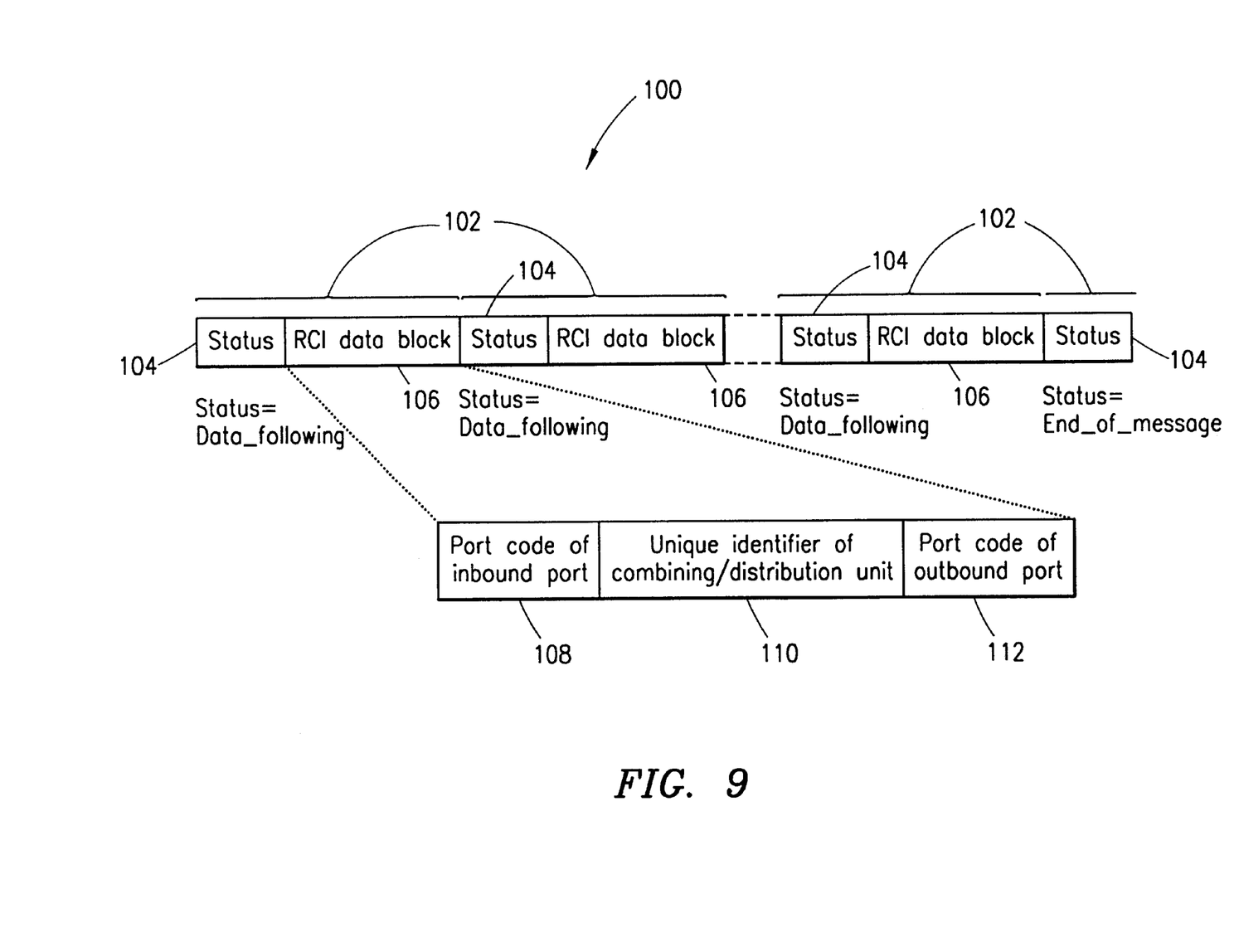
FIG. 9 is an illustration of an exemplary structure of an RCI data message of the present invention.

Referring now to FIG. 9, the preferred structure of an RCI data message 100 is illustrated. The RCI data message 100 defines one complete signal path from an antenna 28 to a transceiver 30 and includes a plurality of RCI data segments 102 that can each include two types of blocks—status information blocks 104 and RCI data blocks 106. The status information block 104 indicates either that an RCI data block 106 follows or that the end of message is reached. The RCI data block 106 contains information about one internal sub-path in a combining/distribution unit 32. Each RCI data block 106 comprises three sub-blocks that unambiguously define the particular internal sub-path: a first sub-block 108 identifying the port code of the inbound port 92, a second sub-block 110 containing the unique identifier of the combining/distribution unit 32, and a third sub-block 112 identifying the port code of the outbound port 94. One RCI data segment comprises either (i) an "end of message" status block 104 or (ii) a status block 104 (indicating that data follows) and an RCI data block 106.

To generate a complete RCI message for each signal path in the base station 12, the various ports in the combining/distribution units 32 must each perform specific functions. For instance, each inbound port 92 of a particular combining/distribution unit 32: (1) generates a "data following" status information block 104; (2) generates an RCI data block 106 containing configuration information for its particular internal sub-path in the combining/distribution unit 32 (i.e., the port code of the inbound port 92 itself, an identifier for the combining/distribution unit 32, and the port code of the outbound port 94 to which the inbound port 92 is connected inside the unit 32); (3) accepts RCI data segments 102 that are forwarded from an internally connected outbound port 94; and (4) sends out the newly generated status information block 104 and RCI data block 106 and the received RCI data segments 102 toward the transceiver units 30 via an RF cable 50 or 52 attached to the inbound port 92.

The outbound ports 94, on the other hand, function to receive configuration information from more remotely located combining/distribution units 32 and to forward the generated and received information to each associated inbound port 92 (i.e., each inbound port 92 to which the outbound port 94 is internally connected). In addition, for generating complete RCI data messages 100, it is important to know which outbound ports 94 are connected to the antenna interface (or other "exploration end point") in a particular radio configuration. Accordingly, each antenna-type outbound port 94: (1) generates an "end of message" status information block 104; and (2) forwards the generated status information block 104 to all of the internally connected inbound ports for the particular combining/distribution unit 32. Each in-chain type outbound port 94: (1) receives RCI data segments 102 transmitted over an attached RF cable 50 or 52 from an inbound port 92 of another combining/distribution unit 32 (or from a different inbound port 92 of the same combining/distribution unit 32); and (2) forwards the received data segments 102 to all of the internally connected inbound ports 92.

Finally, special treatment is necessary for chain-end type outbound ports 94 because chain-end type outbound ports 94 can be connected to either an antenna 28 or an inbound port 92 depending on the actual radio configuration. Each chain-end port 94 must be able to handle both cases, and based on whether RCI data is received by the chain-end port 94, the chain-end port 94 is able to determine whether it is connected to an antenna 28 or to an inbound port 92. Therefore, each chain-end type outbound port 94: (1) monitors an attached RF cable 50 or 52 for RCI data segments 102; (2) generates an "end of message" status information block 104 if no RCI data segments 102 are received; and (3) forwards the received RCI data segments 102 and/or the generated status information 104 to all of the internally connected inbound ports 92.

Figure 10:
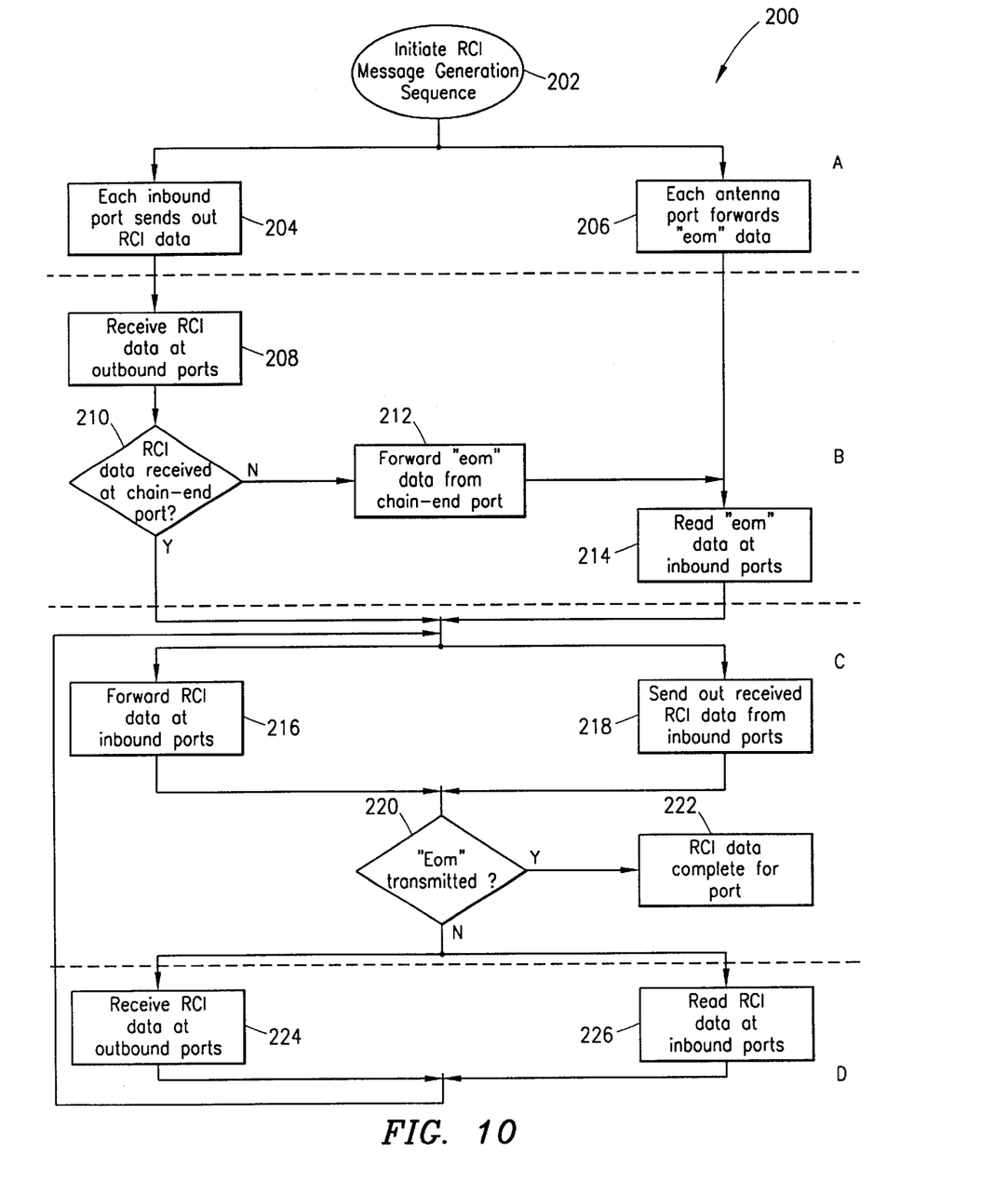
FIG. 10 is a flow diagram of a data transfer method illustrating the RCI message generation sequence of the present invention.

Referring now to FIG. 10, there is shown a flow diagram of a data transfer method 200 illustrating the sequence of events for generating an RCI message 100 in accordance with the present invention. First, the RCI message generation sequence 200 is initiated at step 202. Several options are available for controlling the sequence initiation. Which option is selected depends on the needs of the particular system and on the hardware units that are used. One option is to have externally initiated RCI message generation. In this option, the transceiver units 30 broadcast an initiation command over the digital interfaces 46 (see FIG. 2). As a result, the entire RCI message generation sequence 200 is performed once, and one complete RCI message is created for each signal path of the particular RBS 12 configuration. A second option is to provide externally controlled RCI message generation. In this option, each message transmittal step (i.e. steps 204, 206, 212, 216, and 218, discussed below) of the RCI message generation sequence 200 is individually initiated when the transceiver units 30 broadcast a command to the combining/distribution units 32 over the digital interfaces 46. Preferably, when using either the externally initiated or externally controlled options, the RCI messages 100 are generated on a periodic or cyclic basis to provide or maintain the RF cable supervision functionality. A third possible initiation option is to provide autonomous RCI message generation, wherein each combining/distribution unit 32 carries out the appropriate steps of the sequence 200 without receiving any commands from the transceivers 30. To keep the RCI data updated in this third option, the sequence 200 is periodically repeated.

After initiation of the sequence 200, each inbound port 92 sends out a "data following" status information block 104 and an RCI data block 106 (describing the internal connection of the inbound port 92 within its own combining/distribution unit 32) at step 204. At approximately the same time, during a first stage A of the sequence 200, each antenna-type outbound port 94 forwards an "end of message" ("eom") status information block 104 to all of its internally connected inbound ports 92 at step 206.

Next, during a second stage B, the data segment 102 sent from each inbound port 92 is received at step 208 by an outbound port 94 of a combining/distribution unit 32 that is coupled to the particular inbound port 92 by an RF cable 50 or 52. At step 210, it is determined if an RCI data segment 102 has been received at each chain-end outbound port 94. For each chain-end outbound port 94 that has received a data segment 102, the sequence 200 progresses to a third stage C. On the other hand, if no data segment 102 is received by a specific chain-end port 94, then that chain-end port 94 forwards an "end of message" status information block 104 to all of its internally connected inbound ports 92. At step 214, "end of message" data 104 is received from the antenna ports 94 and the applicable chain-end ports 94 by the internally connected inbound ports 92.

The problem with the use of chain-end ports 94 is that the base station 12 in general does not provide synchronous timing between different combining/distribution units 32. As a result, it is difficult to determine how long a chain-end port 94 should wait for incoming RCI data before the port 94 decides to generate an "end of message" status block 104. One possible solution is to implement a sufficiently long delay between the inbound ports' transmission of RCI data at step 204 and the decision step 210 at the chain-end port 94 to ensure that RCI signals have time to reach the chain-end port 94. Alternatively, an externally controlled RCI message generation process could be implemented so as to trigger the different steps of the sequence 200 by sending commands over the digital interface 46 from the transceivers 30 to the combining/distribution units 32. Using this process, sufficient time to receive RCI signals, if any, at a chain-end port 94 can be ensured, regardless of any timing differences between combining/distribution units 32, by implementing a sufficient delay between the commands for initiating steps 104 and 110.

During the third stage C, the received RCI data segments 102, if any, are forwarded by the receiving outbound ports 94 to all internally connected inbound ports 92 at step 216. At approximately the same time, each inbound port 92 that has read an RCI data segment 102 from an internally connected outbound port 94 sends out the read data segment 102 over the attached RF cable 50 or 52 at step 218. If an "end of message" status block 104 was sent out or forwarded at step 216 or 218 (as can be determined for each port 92 and 94 at step 220), then it is known (as indicated at 222) that the RCI message generation sequence 200 is complete for that particular port 92 or 94. For each port 92 or 94 that did not send out an "end of message" status block 104, however, the sequence 200 continues into a fourth stage D. RCI data segments 102 are received over RF cables 50 or 52 by the outbound ports 94 at step 224 and are read by the inbound ports 92 from internally connected outbound ports 94 at step 226. The steps of the third and fourth stages C and D are repeated until the message generation is complete (as indicated at 222) for every port 92 and 94 in the base station 12, or, in other words, until a complete RCI message has been generated and received by the transceivers 30 for each separate signal path in the base station 12.

Referring again to FIG. 8, an example of the generation of an RCI message, in accordance with the sequence 200 of FIG. 10, for a complete signal path will now be discussed. The portion of the base station 12 depicted in the Figure includes only one transceiver 30 and two antennas 18(1) and 18(2). Presumably, although not necessarily, the complete base station 12 includes more than one transceiver 30. Four different combining/distribution units 32(1), 32(2), 32(3), and 32(4) are also illustrated. The interconnections between the illustrated hardware elements form two RF reception signal paths and one RF transmission signal path. Each of the various boxes 240 illustrates the precise RCI data segment 102 that is being transferred over the various RF cables 50 and 52 at different points in time T1, T2, T3, and T4. These points in time correspond to several consecutive transfers of RCI data between successive ports 92 or 94 along the signal path (i.e., from an inbound port 92 of one combining/distribution unit 32 to a connected outbound port 94 of another combining/distribution unit 32 or from an outbound port 94 to an internally connected inbound port 92). Thus, each of the RCI data segments 102 shown in the boxes 240 of FIG. 8 essentially represent a snapshot of the RCI data that is being transferred over the corresponding RF cable 50 or 52 at a particular point in time. These points in time T1, T2, T3, and T4 relate to the sequence 200 of FIG. 10 but do not correspond to the stages A, B, C, and D. Exemplary port codes are used to simplify the description of the message generation.

One of the RF reception signal paths illustrated in FIG. 8 transmits signals from the first antenna 28(1) to a first port 31 of the transceiver 30. This signal path runs from the first antenna 28(1) to "port #12" of the first combining/distribution unit 32(1), through a duplexer 54, and to "port #18" of the first combining/distribution unit 32(1). The signal path then runs along a first RF reception cable 52(1) to "port #64" of the second combining/distribution unit 32(2), through an amplifier 56, and to "port #23" of the second combining/distribution unit 32(2). The signal path continues along a second RF reception cable 52(2) to "port #37" of the fourth combining/distribution unit 32(4), through a pair of 1:2 splitters 58, to "port #51" of the fourth combining/distribution unit 32(4), and across a third RF reception cable 52(3) to the first port 31(1) of the transceiver 30. It will be appreciated that "port #12", "port #64", and "port #37" in this example are outbound ports 94, while "port #18", "port #23", and "port #51" are inbound ports 92.

In accordance with the RCI message generation sequence 200, each of the inbound ports 92 sends out an RCI data segment 102 for its own internal connection (i.e., at step 204) upon initiation of the sequence 200. Thus, as shown in the box 240(1) corresponding to the first RF reception cable 52(1), "port #18" sends out a first RCI data segment 102(1) (i.e., "df|18|id_1|12") over the first RF reception cable 52(1) at a first point in time T1. This first RCI data segment 102(1) comprises a status information block 104 indicating that data is following (i.e., "df"), a first sub-block 108 identifying the inbound port 92 (i.e., "18"), a second sub-block 110 containing a unique identifier for the combining/distribution unit 92 (i.e., "id_1"), and a third sub-block 112 identifying the outbound port 94 (i.e., "12"). Also at the first point in time T1, "port #12", or a device associated with "port #12", generates an end of message (i.e., "eom") data segment 102(4) and transmits the end of message data segment 102(4) to "port #18".

Similarly, at the same time, "port #23" sends out a second RCI data segment 102(2) (i.e., "df|23|id_2|64") over the second RF reception cable 52(2) as shown in the box 240(2) corresponding to the second RF reception cable 52(2). This data identifies a second portion of the specific signal path. Also at the same time, "port #51" sends out a third RCI data segment 102(3) (i.e., "df|51|id_4|37") over the third RF reception cable 52(3) as shown in the box 240(3) corresponding to the third RF reception cable 52(3). Subsequently, each of these data segments 102 propagates through the signal path at later points in time T2, T3, and T4. Thus, at the second point in time T2, "port #18" sends out the end of message data segment 102(4) generated by "port #12", "port #23" sends out the first data segment 102(1), and "port #51" sends out the second data segment 102(2). At the third point in time T3, "port #18" is idle, "port #23" sends out the end of message data segment 102(4), and "port #51" sends out the first data segment 102(1). Finally, at the fourth point in time T4, "port #18" and "port #23" are idle and "port #51" sends out the end of message data segment 102(4).

Therefore, when the message for the specific signal path is complete, the transceiver 30 essentially has a list of ports 92 and 94 and combining/distribution units 32 for that signal path starting at the transceiver and ending at the antenna 28(1) interface. Using this information, in conjunction with the internal sub-path information that is obtained via the digital interface 46, the RBS 12 is able to develop an accurate identification of the exact radio configuration.

Figure 11:
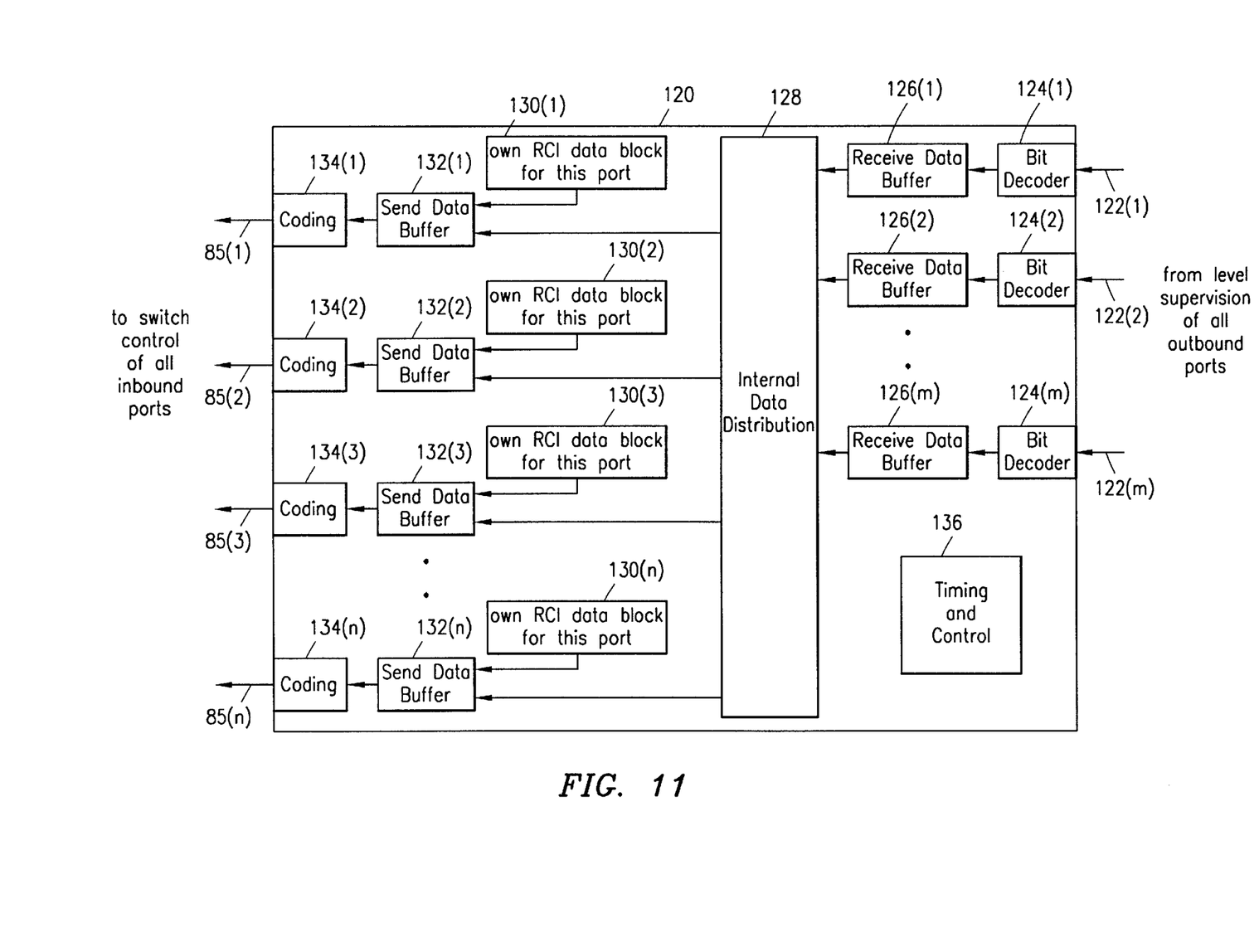
FIG. 11 is a block diagram of an RCI control circuit for implementing the process of the present invention in the combining/distribution units.

Referring now to FIG. 11, there is illustrated an RCI control circuit 120 for implementing the process of the present invention. Preferably, the RCI control circuit 120 comprises an application specific integrated circuit (ASIC). By using such an ASIC 120, all of the necessary hardware for implementing the RCI data generation sequence 200 can be integrated in one circuit. As an alternative, however, it is also possible to use micro-controllers or suitable programmable logic devices as hardware platforms.

Each combining/distribution unit 32 includes a single ASIC 120 for receiving RCI data from each outbound port 94 of the combining/distribution unit 32, processing the information, generating own RCI data blocks 106 for all inbound ports of the combining/distribution unit 32, routing of RCI data received at outbound ports 94 of the combining/distribution unit 32 to all applicable inbound ports 92 (i.e., all inbound ports 92 internally connected to an outbound port 94), and sending out RCI data to an appropriate inbound port 92. The ASIC 120 depicted in the Figure is capable of performing the RCI message generation sequence 200 for a combining/distribution unit 32 having m outbound ports 94 and n inbound ports 92. The ASIC 120 includes m bit decoders 124, m receive data buffers 126, a single internal data distribution circuit 128, n own RCI data buffers 130, n send data buffers 132, n coding devices 134, and a single timing and control circuit 136.

Thus, coded RCI data (e.g., $V_{mon}$ from FIG. 7) is received (as indicated at 122) at the ASIC 120 from each of m outbound ports 94. The incoming digital bit stream for each outbound port 94 is decoded by the bit decoder 124 and stored in the receive data buffer 126. The internal data distribution circuit 128 forwards information from the received data buffer 126 to all appropriate ones of the n send data buffers 132 by determining which inbound ports 92 are connected by an internal sub-path of the combining/distribution unit 32 to each outbound port 94. This information can be hard-coded into the ASIC 120. Alternatively, the current internal sub-path(s) can be selected from a preprogrammed list of all of the possible internal sub-paths in the ASIC 120, or the ASIC 120 can include a configurable memory that is programmed with the current internal sub-path(s). For performing the first stage A of the sequence 200, each send data buffer 132 receives data from a corresponding own RCI data buffer 130, which stores the RCI data block 106 for the associated one of the inbound ports 92. After the first stage A, the send data buffer 132 receives data from the internal data distribution circuit 128. RCI information from the send data buffer 132 is sent to the corresponding coding device 134 where it is sent to the switch 86 (see FIG. 7) via the switch control line 85. Timing and control functions are performed by the timing and control circuit 136 in accordance with signals received from an external clock source (not shown) and from the transceivers 30 over basic interface circuitry (not shown).

Although a preferred embodiment of the method and apparatus of the present invention has been illustrated in the accompanying Drawings and described in the foregoing Detailed Description, it is understood that the invention is not limited to the embodiment disclosed, but is capable of numerous rearrangements, modifications, and substitutions without departing from the spirit of the invention as set forth and defined by the following claims.

What is claimed is:

1. A method for autonomously determining a configuration of a radio base station in a telecommunications system, comprising the steps of:

generating, at a first device of the radio base station, a radio configuration information signal including data identifying at least one port of the first device, the at least one port comprising a part of a signal path for routing radio signals in the base station;

transmitting, from the at least one port of the first device, the radio configuration information signal along the signal path;

receiving the radio configuration information signal at a second port within the radio base station; and examining the data included in the radio configuration information signal to identify an interconnection between the at least one port of the first device and the second port, the interconnection comprising at least a portion of the signal path.

2. The method of claim 1, wherein the first device comprises a first combining/distribution unit.

3. The method of claim 2, wherein the second port comprises part of a transceiver in the radio base station.

4. The method of claim 2, wherein the first combining/distribution unit includes the second port.

5. The method of claim 4, wherein the data in the radio configuration information signal identifies a first inbound port and a first outbound port of the first combining/distribution unit, the first inbound port and the first outbound port each comprising a part of the signal path, wherein the at least one port of the first combining/distribution unit comprises the first inbound port.

6. The method of claim 5, further comprising the steps of:

generating, at the first combining/distribution unit, a revised radio configuration information signal including data identifying a second inbound port and a second outbound port of the first combining/distribution unit and including the data identifying the first inbound port and the first outbound port of the first combining/ distribution unit, the second inbound port and the second outbound port each comprising a part of the signal path, wherein said second port comprises the second outbound port;

transmitting the revised radio configuration information signal along the signal path, the revised radio configuration information signal transmitted from the second inbound port; and wherein said step of examining the data included in the radio configuration information signal comprises examining the data in the revised radio configuration information signal.

7. The method of claim 2, wherein the second port comprises part of a second combining/distribution unit in the radio base station.

8. The method of claim 7, wherein the data in the radio configuration information signal identifies an inbound port and an outbound port of the first combining/distribution unit, the inbound port and the outbound port each comprising a part of the signal path, wherein the at least one port of the first combining/distribution unit comprises the inbound port of the first combining/distribution unit.

9. The method of claim 8, further comprising the steps of:

generating, at the second combining/distribution unit, a revised radio configuration information signal including data identifying an inbound port and an outbound port of the second combining/distribution unit and including the data identifying the inbound port and the outbound port of the first combining/distribution unit, the inbound port and the outbound port for the second combining/distribution unit each comprising a part of the signal path, wherein said second port comprises the outbound port for the second combining/distribution unit;

transmitting the revised radio configuration information signal along the signal path, the revised radio configuration information signal transmitted from the inbound port of the second combining/distribution unit; and wherein said step of examining the data included in the radio configuration information signal comprises examining the data in the revised radio configuration information signal.

10. The method of claim 9, further comprising the step of receiving the revised radio configuration information signal at a transceiver of the radio base station.

11. The method of claim 10, wherein the signal path includes a radio frequency link between an antenna and the transceiver.

12. The method of claim 1, wherein the step of generating the radio configuration information signal includes varying a DC voltage level of a radio frequency cable on a radio frequency interconnection between the first device and the second port.

13. The method of claim 1, further comprising the step of determining a plurality of signal paths between at least one antenna and at least one transceiver of the base station, wherein at least one of the plurality of signal paths is routed through a combining/distribution unit.

14. The method of claim 1, wherein the radio configuration information signal comprises a signal having a frequency significantly different than a frequency of said radio signals.

15. A method for autonomously determining at least a portion of a radio configuration for a base station in a telecommunication system, comprising the steps of:

receiving a first radio configuration information signal at a first port of a combining/distribution unit, the first radio configuration information signal received over a portion of a signal path for routing radio signals in the base station, and the first radio configuration information signal having a different frequency than the radio signals;

filtering the received first radio configuration information signal to remove the radio signals; and identifying an interconnection between the combining/distribution unit and a preceding device based on the information in the received first radio configuration information signal.

16. The method of claim 15, wherein the step of identifying said interconnection is further based on an identifier of the first port.

17. The method of claim 15, further comprising the steps of:

generating a second radio configuration information signal for transmission from a second port of the combining/distribution unit, the second radio configuration information signal including a port code for the first port, a port code for the second port, and a unique identifier for the combining/distribution unit; and transmitting the second radio configuration information signal from the second port to a succeeding port of the signal path.

18. The method of claim 17, further comprising the step of forwarding the first radio configuration information signal from the second port to the succeeding port.

19. The method of claim 15, wherein the radio configuration information signal comprises a digital signal.

* * * * *